Dec. 11, 1934.   S. L. INGERSOLL   1,983,760
PROCESS OF MAKING COMPOSITE METALLIC ARTICLES
Filed June 27, 1932   2 Sheets-Sheet 2
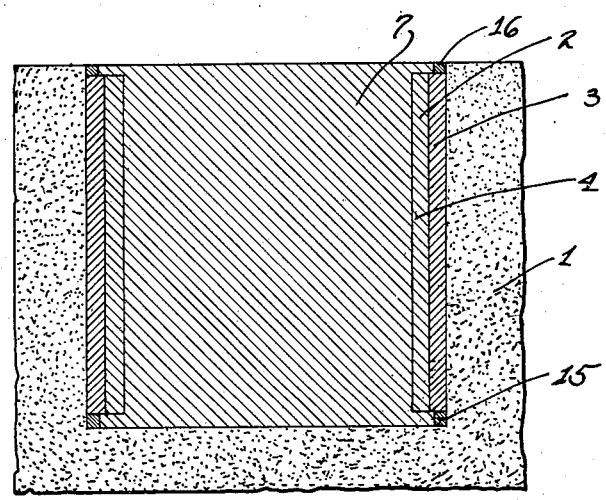
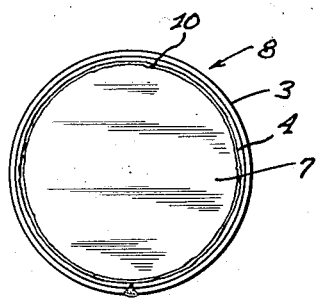
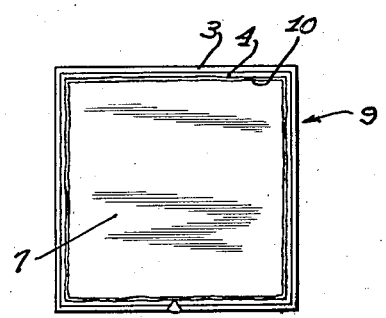
Inventor
Stephen L. Ingersoll.

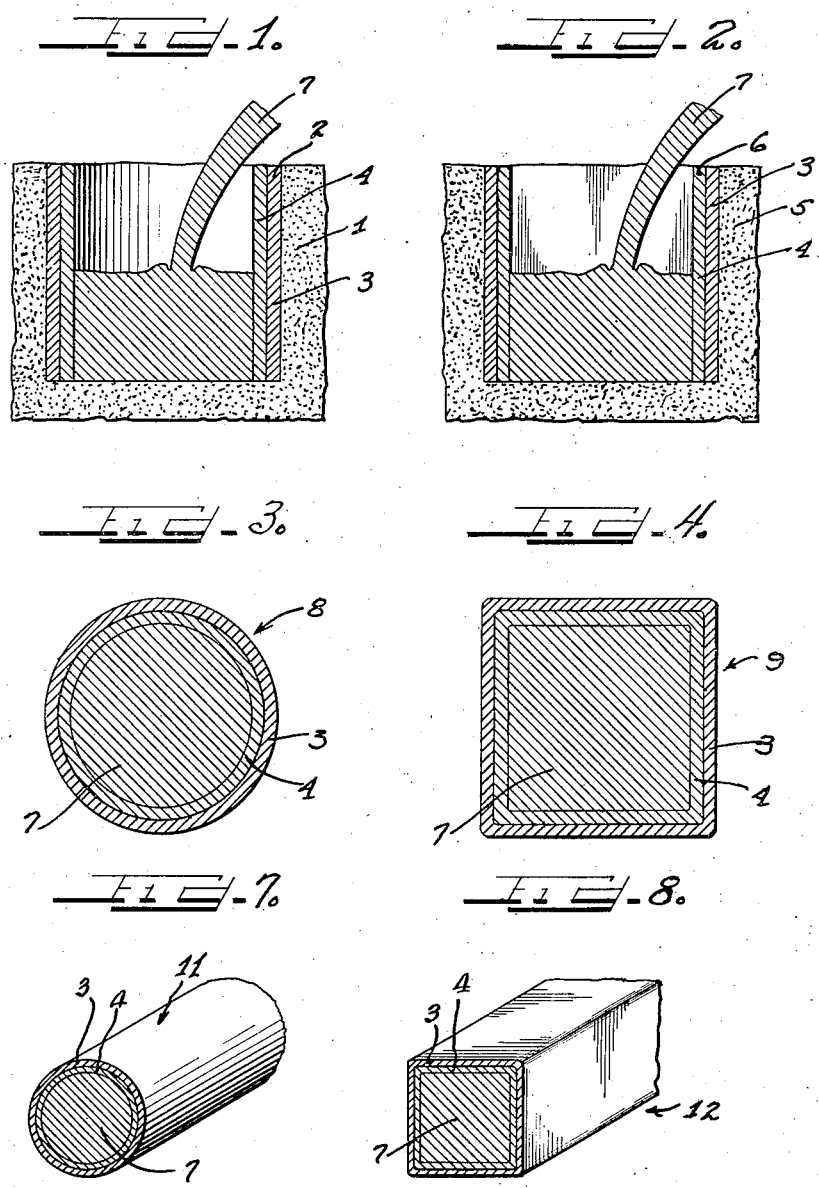

Patented Dec. 11, 1934

1,983,760

UNITED STATES PATENT OFFICE 1,983,760

PROCESS OF MAKING COMPOSITE METAL-
LIC ARTICLES

Stephen L. Ingersoll, Chicago, Ill., assignor to
Ingersoll Steel and Disc Co., Chicago, Ill., a
corporation of Illinois Application June 27, 1932, Serial No. 619,423

6 Claims. (Cl. 29—188)

This invention relates to a method of making composite metal articles and particularly metal articles having an outer layer of stable surface alloy.

It has heretofore been proposed to form composite metal articles having an outer coating of a protective metal in various ways, as, for instance, by pouring molten metal about a core of another metal or by pouring different metals in a mold having a diaphragm therein.

While such methods have been found suitable for certain metals, particularly for uniting non-ferrous metals or for uniting a non-ferrous metal to a steel, much difficulty is encountered in uniting alloys such as rustless iron or stainless steel to various irons and steels by these methods. Particularly where a high carbon steel is used as the core metal, the carbon of the steel tends to migrate toward the surface alloy and to become absorbed thereby, thus rendering the stable surface alloy less effective in its properties.

It is further extremely difficult to weld a stainless steel sheet to a core of different composition and if such sheet and core are to be subjected to rolling processes other than the rolling into plain flat sheets, the different coefficients of expansion and contraction of such adjacent metals, coupled with the unequal strains set up in such rolling processes, make it practically impossible to avoid undesirable separation of such adjacent surfaces. The present invention has for its principal object the overcoming of such difficulties by utilizing a shell formed of a sheet of composite metal, the outer layer of which may be stainless steel or other stable surface alloy and the inner layer of which is steel or other metal of good welding properties. By utilizing such a shell and pouring molten steel therein, it will be obvious that a good weld is secured between the steel of the core and the inner layer of the composite sheet forming the shell. Such composite sheet which is used in forming the shell is a sheet previously made by a process referred to hereinafter in such a manner that the stainless steel or other stable surface alloy outer layer and the steel inner layer thereof are firmly and permanently welded together.

Accordingly, it is an object of this invention to produce a composite metal article by a method which insures a permanent and safe bond between the metals.

It is a further object of this invention to produce a composite metal bar having a stable alloy surface by uniting a steel to a composite tube having a layer of a stable surface alloy thereon.

These and other objects of this invention will be apparent from the following description and appended claims.

This invention (in a preferred form) is illustrated in the accompanying drawings and hereinafter more fully described.

On the drawings:

Figure 1 is a vertical sectional view of an insulating container showing a composite metal cylinder therein and a metal being poured into said cylinder.

Figure 2 is a view similar to Figure 1 but showing the insulating container and composite metallic member of different cross sectional shape.

Figure 3 is a sectional view of the ingot formed in the insulating container of Figure 1.

Figure 4 is a sectional view of an ingot formed in the insulating container of Figure 2.

Figure 5 is an end view of an ingot formed in the insulating container of Figure 1.

Figure 6 is an end view of an ingot formed in the insulating container of Figure 2.

Figure 7 is an isometric view of a rod drawn from the ingot of Figures 3 and 5, showing a cross section thereof.

Figure 8 is an isometric view of a rod drawn from the ingot of Figures 4 and 6, showing a cross section thereof.

Figure 9 is a vertical sectional view of an insulating container and composite metal member illustrating a step in a modified form of process.

As shown on the drawings:

In carrying out my invention, I provide an insulating container of any suitable material, into which a shell 2 is placed. The shell 2 comprises an outer layer 3 of a stable surface alloy, such as a heat and corrosion resisting steel having 18% chromium and 8% nickel, known as stainless steel. Steels having 20% chromium and 10% nickel, and 25% chromium and 12% nickel have proved satisfactory. In general, steels having from 12 to 30% chromium and from 0–15% nickel may be used. The shell 2 also has an inner layer 4 of any suitable steel, an alloy steel suitable for heat treatment being preferred. The layers 3 and 4 are firmly bonded to provide the composite metal shell 2 and the longitudinal edges of the composite sheet forming the shell are welded together.

In Figure 1, an insulating container, circular in cross section, is illustrated. The composite metal shell 2 is cylindrical and of such size as to fit the container. In Figure 2, a container 5 having a square cross section is illustrated. The shell 6 used with this container is preferably a rectangular prism which snugly fits within the container. The shell 6 is provided with an outer layer of a stable surface alloy 3 and an inner layer 4 of steel, as described with reference to shell 2. It will be understood that, although only containers having circular and square cross section have been illustrated, containers of any desired cross section, such as hexagonal or octagonal, may be used. In each case, however, the composite shell may be likewise formed with a similar cross sectional shape.

With sufficiently large diameter shells, the container, if desired, may be dispensed with altogether. In such cases, the bottom of the shell may be closed by having a plate welded thereto to retain the molten metal poured therein.

The shells 2 and 6 may be formed in any suitable manner, but preferably a composite metal sheet is formed in the manner set out in my copending application, Serial No. 582,375, filed December 21st, 1931, entitled "Process of making laminated metal," now Patent No. 1,868,749. Briefly the process of my Patent No. 1,868,749 comprises placing a pair of cleaned corrosion resistant metal slabs in juxtaposed relation with a separating composition therebetween and pouring a metal such as mild steel around the slabs. The resulting ingot is then rolled into a flat pack and the edges are clipped from the pack to separate two sheets therefrom. Each sheet has a surface layer of corrosion resistant metal backed with a layer of the cast metal integrally united thereto. The composite metal sheet thus formed may be made into tubular form by any suitable process.

After the shell has been placed in the container, molten steel 7, sufficient to fill the shell, is poured therein. The particular steel used is not an important feature of this invention, but it has been found that this process can be used successfully in forming bumper bars where the core metal is a high carbon steel having from .90 per cent to 1.20 per cent carbon.

After the steel has been poured into the shell, the metals are allowed to cool. In this step of the process, the poured steel is united to the shell to thus form a composite ingot. The ingots formed in containers 1 and 5 are illustrated at 8 and 9 respective in Figures 3 and 4. End views of the ingots 8 and 9 are illustrated in Figures 5 and 6, respectively. As shown in these latter figures, the adjacent end edges of the shell and core are welded as shown at 10. This welding may be carried out by using an electric arc or acetylene flare, and in the case where the outer layer of the stainless steel is to be welded, a welding rod of stainless steel is used.

The ingot 8 is then reheated and passed one or more times through suitable rollers to form the rod 11 illustrated in Figure 7. This hot rolling of the ingot which is carried out with the metals protected from the atmosphere by the weld at their ends, perfects the bond between the metals and produces, as a result thereof, a steel rod having a comparatively thin outer coating of stainless steel or other stable surface alloy.

The ingot 9 may be likewise hot rolled to produce a suitable rod or bar. Likewise, in this case, the end edges of the layers of metal are welded previous to the rolling. In Figure 8, a rod or bar 12 of square cross section is illustrated. The bar 12 is formed from the ingot 9 in any customary manner of rolling rounds and bars.

It will be understood that ingots of any cross sectional shape may be formed and rolled to provide bars of reduced dimensions.

The particular metals for forming the core and the metal for forming the inner layer 4 of the shell are not of prime importance. Low carbon steel, high carbon steel and alloy steels may be used. However, it is preferable to have the steel of layer 4 and the steel of core 7 of similar analysis as such metals can be more readily bonded. Also, such metals will have equal or nearly equal coefficients of expansion and consequently there is no tendency of the core to pull away from the shell as the metal solidifies.

Figure 9 illustrates a step in a slightly modified process. In this case, a ring 15, preferably of metal, which is of sufficient size to extend under the outer layer 3 but not the inner layer 4 of the shell 2, is placed at the bottom of the container 1 beneath the layer 3. The shell 2 is then placed down on the ring 15 and a similar ring 16 may be used at the top of the mold. The metal core 7 is then poured into the shell and due to the presence of the ring 16 the metal 7 flows under the shell 2 to underlie the adjacent edges of the layers comprising the shell. Likewise, the metal 7 is poured to a sufficient depth to flow over the inner layer 4 and a portion of the outer layer 3 of the composite shell 2. As a result of this method of pouring the core, the end edges of the composite layers need not be welded before rolling as the portion of the metal 7 flowing under and over the shell serves to protect the surfaces in the subsequent rolling. The shells need not snugly fit the container, but in the modified process where the poured metal 7 is used to protect the surfaces of the layers, the members 15 and 16 should snugly fit against the inner wall of the container to prevent any of the core metal from being poured down adjacent the layer 3 of the shell. If the shells snugly fit the container, the upper ring 16 may be dispensed with and bridges may be used in place of the lower ring.

The diameter of the shell in each case is many times greater than the thickness of the shell, and when the ingot is reduced by rolling the outer layer of the shell forms a very thin coating.

This process has been successfully used to produce bar members having outer surfaces of stable alloys, and it has been found to be expedient and economical and also to provide an article which will successfully withstand heat and corrosion.

It will be understood that the outer layer can be formed of ordinary steel and the inner layer of heat and corrosion resisting alloy and in this case molten alloy is poured within the shell. In such instances, the ingot may be pierced in a well known manner to provide a tubular member with a lining of the corrosion resisting alloy.

I am aware that many changes may be made and numerous details may be varied through a wide range without departing from the principles of this invention, and I therefore do not purpose limiting the patent granted hereon otherwise than necessitated by the prior art.

I claim as my invention:

1. The method of producing a composite metal bar which comprises placing a composite metal tubular shell within a container, supporting the shell so that there is a space therebeneath and thereabove, pouring molten metal in the shell to form an ingot with the cast metal overlying the end edges of the shell and subsequently rolling the ingot to reduce its cross sectional area and to completely unite the metals.

2. The method of making a metal bar having an outer layer of stable surface alloy, which comprises placing a shell, having an outer layer of a stable surface alloy and an inner layer of steel, within a container, supporting the shell so that metal can be poured below and above the adjacent end edges of the layers comprising the shell, pouring molten steel within the shell to form an ingot, and subsequently hot rolling the ingot to reduce its cross sectional area and to completely unite the metals.

3. The method of making a metal bar having an outer layer of stable surface alloy, which comprises providing a cylinder the outer portion of which is a stable surface alloy and the inner portion of which is steel, casting molten steel within said cylinder and over the edges thereof whereby said edges are protected from the atmosphere, and rolling the comopsite ingot so formed into a bar by applying rolling pressure to all of the lateral surfaces thereof.

4. The process of forming a composite metal article which comprises placing a composite metal shell into a mold, said shell having an inside surface of one metal backed by an outside surface of another metal integrally welded thereto, spacing the shell from the bottom of the mold, pouring molten metal of the same character as the inside surface metal of the shell into the shell and allowing the cast metal to overlie the end edges of the shell.

5. The method of forming a metal article having a core of one metal integrally welded to a surface sleeve of a corrosion resistant metal which comprises casting a molten metal around a pair of slabs of corrosion resistant metal, said slabs being in juxtaposition with a separating composition therebetween, rolling the resulting ingots into a flat pack, clipping off the edges of the pack to separate the same into two sheets each having a corrosion resistant metal surface backed with a layer of the cast metal, lining the walls of a mold with one of said sheets with the corrosion resistant surface against said walls and casting molten metal of the same characteristics as the inside layer of the sheet into the mold to integrally weld the cast metal with the sheet.

6. The method of producing a composite metal article which comprises casting a mild steel around a pair of stainless steel slabs in juxtaposed relation with a separating compound therebetween, rolling the resulting ingot into a flat pack, clipping the edges of the pack to separate the same into two sheets each having a surface layer of stainless steel backed by a layer of mild steel integrally united therewith, forming a shell of one of said sheets with the mild steel layer on the inside thereof, casting mild steel of the same characteristics as the mild steel of the shell into said shell and rolling the resulting mild steel filled ingot to produce an article having a stainless steel surface therearound and a core of mild steel integrally welded thereto.

STEPHEN L. INGERSOLL.